US012798010B2

(12) United States Patent
Chung et al.

(10) Patent No.: US 12,798,010 B2
(45) Date of Patent: Nov. 17, 2026

(54) SECONDARY BATTERY ELECTRODE PRODUCTION SYSTEM

(71) Applicant: YOUIL ENERGY TECH.CO.,LTD, Gyeonggi-do (KR)

(72) Inventors: Youn Gil Chung, Gyeonggi-do (KR); Byoung Yeul Kim, Gyeonggi-do (KR)

(73) Assignee: YOUIL ENERGY TECH.CO., LTD, Gyeonggi-do (KR)

( * ) Notice: Subject to any disclaimer, the term of this patent is extended or adjusted under 35 U.S.C. 154(b) by 468 days.

(21) Appl. No.: 18/685,596

(22) PCT Filed: Jan. 15, 2024

(86) PCT No.: PCT/KR2024/000704
§ 371 (c)(1),
(2) Date: Feb. 22, 2024

(87) PCT Pub. No.: WO2024/155049
PCT Pub. Date: Jul. 25, 2024

(65) Prior Publication Data
US 2025/0128355 A1 Apr. 24, 2025

(30) Foreign Application Priority Data
Jan. 16, 2023 (KR) ........................ 10-2023-0005885

(51) Int. Cl.
*B23K 26/362* (2014.01)
*H01M 4/139* (2010.01)

(52) U.S. Cl.
CPC ........... *B23K 26/362* (2013.01); *H01M 4/139* (2013.01)

(58) Field of Classification Search
CPC .......... B23K 26/16; B23K 26/38; H01M 4/04
See application file for complete search history.

(56) References Cited

U.S. PATENT DOCUMENTS

2022/0297237 A1 9/2022 Cho et al.

FOREIGN PATENT DOCUMENTS

CN 106 410 113 A 2/2017
KR 101479723 B1 * 1/2015 ............ H01M 4/139
(Continued)

OTHER PUBLICATIONS

KR101479723 Translation (Year: 2015).*
(Continued)

*Primary Examiner* — Woody A Lee, Jr.
(74) *Attorney, Agent, or Firm* — Harness, Dickey & Pierce, P.L.C.

(57) ABSTRACT

An embodiment is a secondary battery electrode production system comprising a notching portion, wherein the notching portion includes a laser portion configured to irradiate the electrode material with a laser beam along a notching line, and a pusher portion disposed above the electrode material, and the pusher portion comprises a pusher in contact with the electrode material and an air blower connected to the pusher, wherein the pusher, during notching, makes contact with an area of the electrode material excluding the notching line, fixing the electrode material while fixing both a coated portion and a non-coated portion of the electrode material, wherein the pusher includes a lower block in contact with the electrode material, an upper block coupled to the lower block, and an air nozzle portion that corresponds to a gap between the lower block and the upper block, and the pusher includes a first pusher and a second pusher.

8 Claims, 18 Drawing Sheets

(56) References Cited

FOREIGN PATENT DOCUMENTS

| | | | | | |
|---|---|---|---|---|---|
| KR | 10-2015-0089803 A | | 8/2015 | | |
| KR | 10-2018-0010803 A | | 1/2018 | | |
| KR | 10-2022-0101886 A | | 7/2022 | | |
| KR | 20220101886 A | * | 7/2022 | ........ | H01M 10/0404 |
| KR | 10-2022-0142148 A | | 10/2022 | | |
| KR | 10-2022-0160324 A | | 12/2022 | | |
| KR | 10-2023-0053489 A | | 4/2023 | | |

OTHER PUBLICATIONS

KR 20220101886 Translation(Year: 2022).*

Extended European Search Report from corresponding EP Application No. 24705346.5, dated Jul. 25, 2025.

International Search Report from corresponding PCT Application No. PCT/KR2024/000704, dated May 1, 2024.

* cited by examiner

SECONDARY BATTERY ELECTRODE PRODUCTION SYSTEM

CROSS-REFERENCE TO RELATED APPLICATIONS

This application is a national phase application of PCT International Application No. PCT/KR2024/000704, filed on Jan. 15, 2024, which claims priority to Korean Patent Application Nos. 10-2023-0005885, filed on Jan. 16, 2023. The entire disclosure of the applications identified in this paragraph is incorporated herein by references.

TECHNICAL FIELD

The present invention relates to a secondary battery electrode production system.

BACKGROUND ART

In general, a chemical battery refers to a battery composed of a positive electrode, a negative electrode, and an electrolyte to thus generate electrical energy using a chemical reaction, and is classified into a primary battery, which is disposable, and a secondary battery, which is chargeable and dischargeable, thus enabling repeated use.

The use of a secondary battery is gradually increasing due to the advantage of its chargeable and dischargeable characteristic. Among such secondary batteries, a lithium secondary battery has high energy density per unit weight, and thus is widely used as a power source in electronic communication devices and in high-power hybrid vehicles.

Electrodes used in such a secondary battery are used as positive and negative electrodes of the battery, and are used to electrically connect the battery to the outside of the battery.

The electrodes are formed through a notching process and a cutting process. The notching process involves forming electrode tabs on an electrode material. The cutting process involves cutting the electrode material on which the electrode tabs are formed into a predetermined length, producing a single sheet of electrodes.

A notching portion configured to perform the etching process includes a mold upper plate and a mold lower plate which include a punching member. As the mold upper plate and mold lower plate move, they punch the electrode material to form electrode tabs. However, the notching portion has a problem of high maintenance costs for the mold. Additionally, after some repetitions of notching process, there is a need to replace components such as the mold or punching member.

To address these issues, an approach is proposed to utilize a laser for the notching process. However, when using a laser for notching, there is a problem with dust adhering to a notching line. Moreover, scattered dust poses a risk of contaminating the surface of the electrode or its surroundings.

DETAILED DESCRIPTION OF THE INVENTION

Technical Problem

An object of the present invention is to provide a secondary battery electrode production system including a notching portion without using a mold.

Technical Solution

According to an embodiment, a secondary battery electrode production system for producing a secondary battery electrode includes a notching portion configured to form an electrode tip of an electrode by notching an electrode material, wherein the notching portion includes a laser portion configured to irradiate the electrode material with a laser beam along a notching line, and a pusher portion disposed above the electrode material, and the pusher portion comprises a pusher in contact with the electrode material and an air blower connected to the pusher, wherein the pusher, during notching, makes contact with an area of the electrode material excluding the notching line, fixing the electrode material while fixing both a coated portion and a non-coated portion of the electrode material, wherein the pusher includes a lower block in contact with the electrode material, an upper block coupled to the lower block, and an air nozzle portion that corresponds to a gap between the lower block and the upper block, and the pusher includes a first pusher and a second pusher, wherein the first pusher and the second pusher are spaced apart from each other in a front-and-rear direction, and the first pusher presses both the coated portion and the non-coated portion, while the second pusher presses only the coated portion, wherein the first pusher includes a body in contact with the coated portion, and an extension portion in contact with both the non-coated portion and the coated portion and the air nozzle portion includes a first air nozzle disposed along the front-and-rear direction on the body and configured to spray air from behind scrap and a second air nozzle disposed along a left-and-right direction on the extension portion and configured to spray air from the side of the scrap.

The lower block may include a first groove formed concavely on an upper surface, the upper block may include a second groove concavely formed on a lower surface, and in a coupled state of the upper block and the lower block, the first groove and the second groove may form an air passage that communicates with the air nozzle portion.

The lower block may include a first surface that forms the air nozzle portion and the upper block may include a second surface that forms the air nozzle portion.

The first surface and the second surface may each be inclined toward an outlet of the air nozzle portion such that the area of the air nozzle portion decreases toward the outlet.

The inclination of the slope formed by the first surface with respect to the lower surface of the lower block may be smaller than the inclination of the slope formed by the second surface with respect to the lower surface of the lower block.

The pusher may fix the electrode material to a base, a lower plate may be further provided which is detachably attached to both ends of the base that correspond to an area irradiated with the laser beam, and a through slot may be formed on an upper surface of the lower plate to facilitate a discharge of scrap generated during notching.

The base may have through slots formed on an area at both ends of the base that corresponds to an area irradiated with the laser beam, facilitating a discharge of scrap generated during notching.

The secondary battery electrode production system may further include an air generating portion disposed above the pusher portion and configured to blow out gas (fume) or dust generated when the laser beam notches the electrode, and a fume hood configured to inhale and discharge gas or dust blown outwards by the air generating portion.

Advantageous Effects

According to an embodiment, notching is performed using a laser instead of a mold, thereby providing the advantageous effect of using a notching portion almost permanently, except for replacing consumable parts.

According to an embodiment, after notching, the cutting process utilizes a knife to cut an electrode material, thereby providing the advantageous effect of increasing the production speed of an electrode.

According to an embodiment, an electrode is brought into close contact with a base at a notching line through a pusher that fixes a coated portion and a non-coated portion of an electrode together, thereby providing the advantageous effect of increasing the quality of notching.

According to an embodiment, an air nozzle is disposed on the pusher, thereby providing the advantageous effect of easily separating scrap from the electrode material after notching. In particular, spraying air to the rear and lateral sides of the scrap facilitates separation of the scrap from the electrode material.

According to an embodiment, a suction portion is arranged adjacent to the base, thereby providing the advantageous effect of easily removing scrap.

According to the embodiment, the space where dust can adhere to the electrode can be minimized.

According to the embodiment, scrap and dust can be removed, preventing the scattering of dust.

MODE FOR INVENTION

Hereinafter, preferred embodiments of the present invention will be described in detail with reference to the accompanying drawings.

The invention may, however, be embodied in many different forms and should not be construed as being limited to the embodiments set forth herein; rather these embodiments are provided so that this disclosure will be thorough and complete, and will fully convey the concept of the invention to one of ordinary skill in the art.

The terminology used herein is for the purpose of describing particular embodiments only and is not intended to be limiting of the present invention. As used herein, the singular forms “a,” “an” and “the” are intended to include the plural forms as well, unless the context clearly indicates otherwise. It will be further understood that the terms “comprises” and/or “comprising” used herein specify the presence of stated features, integers, steps, operations, members, components, and/or groups thereof, but do not preclude the presence or addition of one or more other features, integers, steps, operations, members, components, and/or groups thereof. As used herein, the term “and/or” includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the present invention are described herein with reference to drawings that are schematic illustrations of idealized embodiments of the invention. As such, variations from the shapes of the drawings as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

A secondary battery electrode production system is a device for automatically and continuously producing electrodes used in secondary batteries.

Figure 1:
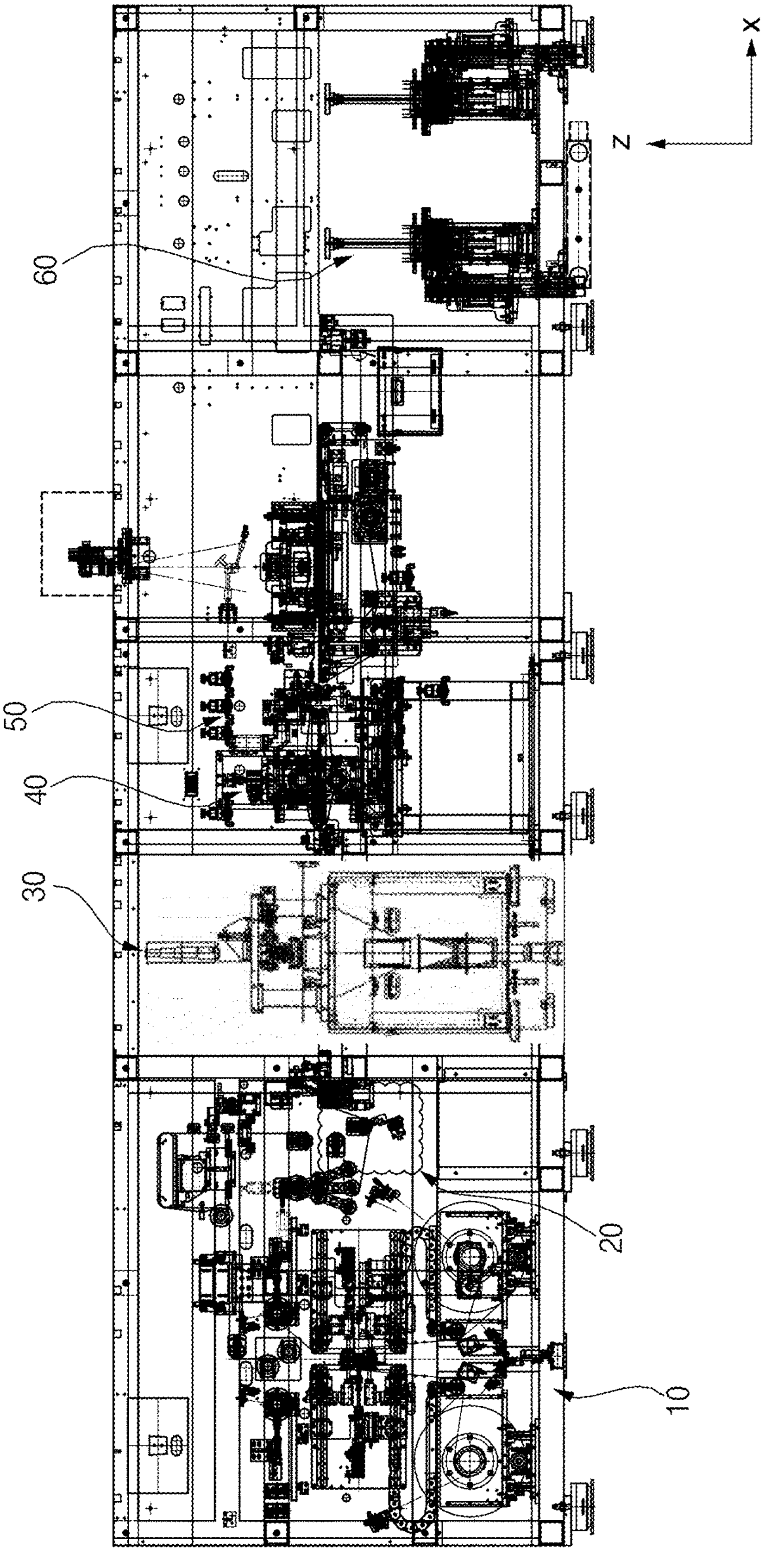
FIG. 1 is a front view showing a secondary battery electrode production system according to an embodiment.

FIG. 1 is a front view of a secondary battery electrode production system according to an embodiment. In the drawings, the direction represented by the x-axis corresponds to a length direction of the secondary battery electrode production system, indicating a direction in which an electrode material is transferred. In the drawings, the direction represented by the y-axis corresponds to a direction between the front and rear of the secondary battery electrode production system, indicating the same direction as the width direction of the electrode material, and the direction represented by the z-axis corresponds to a height direction of the secondary battery electrode production system.

As shown in FIG. 1, the secondary battery electrode production system according to an embodiment includes an unwinding portion 10, a dancer unit 20, a notching portion 30, a feeding device 40, a cutting portion 50, and an alignment device and magazine 60. An electrode material S0 formed as a horizontally elongated strip-shaped metal plate is supplied from the unwinding portion 10. The electrode material S0 is an elongated strip-shaped metal plate that may be formed of copper when producing a cathode battery, or aluminum when producing an anode battery.

The dancer unit 20 guides the electrode material S0 supplied from the unwinding portion 10 to the notching portion 30 and adjusts the tension of the electrode material S0 in response to changes in the supply speed of the electrode material S0.

The notching portion 30 forms electrode tabs Sc (see FIG. 2) on the supplied electrode material S0.

The feeding device 40 supplies the notched electrode material S0 from the notching portion 30 to the cutting portion 50. The feeding device 40 may pull the electrode material S0 at periodically repeating different speeds or tensions.

The cutting portion 50 cuts the supplied electrode material S0 to produce a single sheet of electrodes.

The alignment device and magazine 60 aligns and loads the sheets of electrodes.

Figure 2:
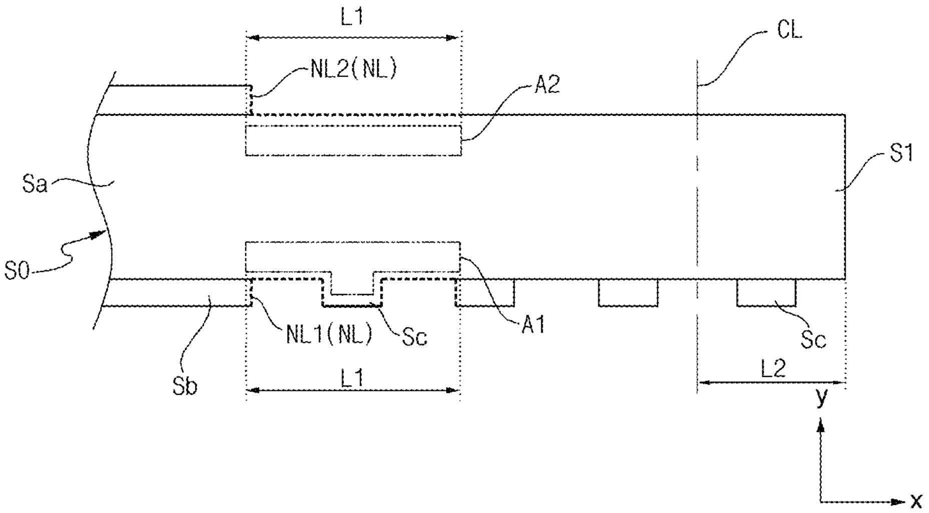
FIG. 2 is a plan view of an electrode material.

FIG. 2 is a plan view of the electrode material S0.

Referring to FIG. 2, the electrode material S0 may be divided into a coated portion Sa and a non-coated portion Sb. The non-coated portion Sb may each be placed in front of and behind the coated portion Sa. The non-coated portion Sb placed in front of the coated portion Sa is cut by the notching portion 30, forming its remaining area into the electrode tab Sc. Notching is performed along a notching line NL on the electrode material S0. The notching line NL may be divided into a front notching line NL1 and a rear notching line NL2. The front notching line NL1 starts at the front edge of the electrode material S0 and forms the electrode tab Sc. The rear notching line NL2 starts at the rear edge of the electrode material S0. The front notching line NL1 includes two bent lines corresponding to the shape of the electrode tab Sc, while the rear notching line NL2 may be a straight line. Laser beam irradiation is performed along the notching line NL.

Figure 3:
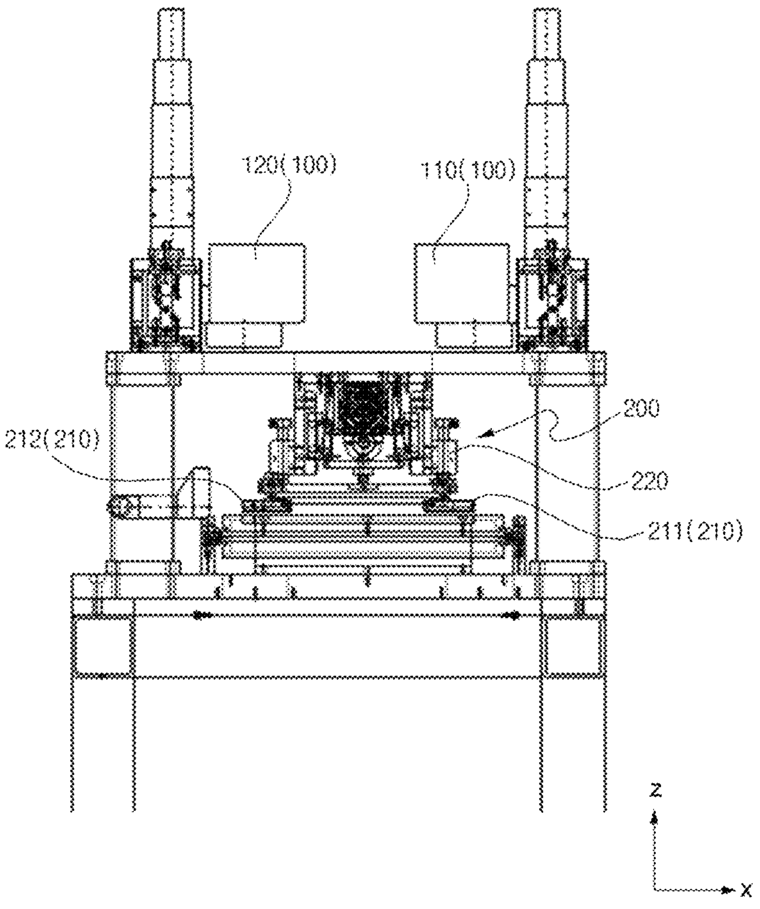
FIG. 3 is a view showing a notching portion.

FIG. 3 is a view showing the notching portion 30.

Referring to FIG. 3, the notching portion 30 irradiates the electrode material S0 with laser for notching. The laser beam, with its high energy density, provides the advantage of precise processing of the electrode tabs Sc. The notching portion 30 includes a laser portion 100 and a pusher portion 200. The laser portion 100 irradiates the electrode material S0 with a laser beam along the notching line NL. The pusher portion 200 serves to pressurize and adjust the electrode material S0 during notching.

The laser portion 100 may be disposed above the pusher portion 200 and emit a laser beam from the top to the bottom. The laser portion 100, in addition to an oscillation device, may include driving devices that move the oscillation device in two or three axes. Therefore, the laser portion 100 may move in the front-and-rear direction y, the transfer direction x, and the height direction z. This laser portion 100 may include a first laser portion 110 and a second laser portion 120. The first laser portion 110 may emit a laser beam along the front notching line NL. The second laser portion 120 may emit a laser beam along the rear notching line NL2. The first laser portion 110 and the second laser portion 120 may be spaced apart from each other in the front-and-rear direction y.

The pusher portion 200 may include a pusher 210 and a driving portion 220. The pusher 210 makes contact with and fixes the electrode material S0. The driving portion 220 is a device that vertically moves the pusher 210 in the height direction z. The pusher 210 may include a first pusher 211 and a second pusher 212. The first pusher 211 and the second pusher 212 may be spaced apart from each other in the front-and-rear direction y. The first pusher 211 may be in contact with the electrode material S0 near the front notching line NL1. The second pusher 212 may be in contact with the electrode material S0 near the rear notching line NL2. The first pusher 211 and the second pusher 212 may descend together, simultaneously making contact with the electrode material S0.

Among these pushers 210, the first pusher 211 fixes both the coated portion Sa and the non-coated portion Sb of the electrode material S0 together, thereby increasing the adhesion of the electrode material S0 to a base B. When notching using a laser, if the electrode material S0 is not adhered to the base B and is floating, there may be defects in the electrode tabs Sc as the laser beam can deviate from the notching line NL. When the first pusher 211 fixes not only the coated portion Sa but also the remaining area of the non-coated portion Sb that forms the electrode tip Sc together with the coated portion Sa, the adhesion of the electrode material S0 to the base B near the front notching line NL1 can be significantly increased, ensuring the quality of notching.

From the perspective of the electrode material S0, it may include a first area A1 and a second area A2 in contact with the pusher 210. The first area A1 and the second area A2 may be spaced apart from each other in the width direction y of the electrode material S0. The first area A1 is positioned near the front notching line NL1 and may be spaced at a predetermined distance from the front notching line NL1. The second area A2 is positioned near the rear notching line NL2 and may be spaced at a predetermined distance from the rear notching line NL2. Here, the first area A1 is formed over the coated portion Sa and the non-coated portion Sb, while the second area A2 may be formed only on the coated portion Sa.

The length L of the first area A1 or the second area A2, i.e., the length of the pusher 210, may be at least greater than the length L2 of a single sheet S1 of electrodes. This is to establish a minimum length of the notching line NL performed at once when the transfer of the electrode material S0 is in a halted state by taking into account the fact that after notching the electrode material S0 is immediately cut in the cutting portion 50 to produce a single sheet S1 of electrodes. Here, the length is defined with respect to the transfer direction x.

Unlike the notching portion 30, the cutting portion 50 physically cuts the electrode material S0 using a knife. The cutting portion 50 cuts the electrode material S0 at once along a cutting line CL to produce a single sheet S1 of electrodes. Therefore, the cutting process progresses rapidly, allowing an increase in the overall speed of the electrode production process.

Figure 4:
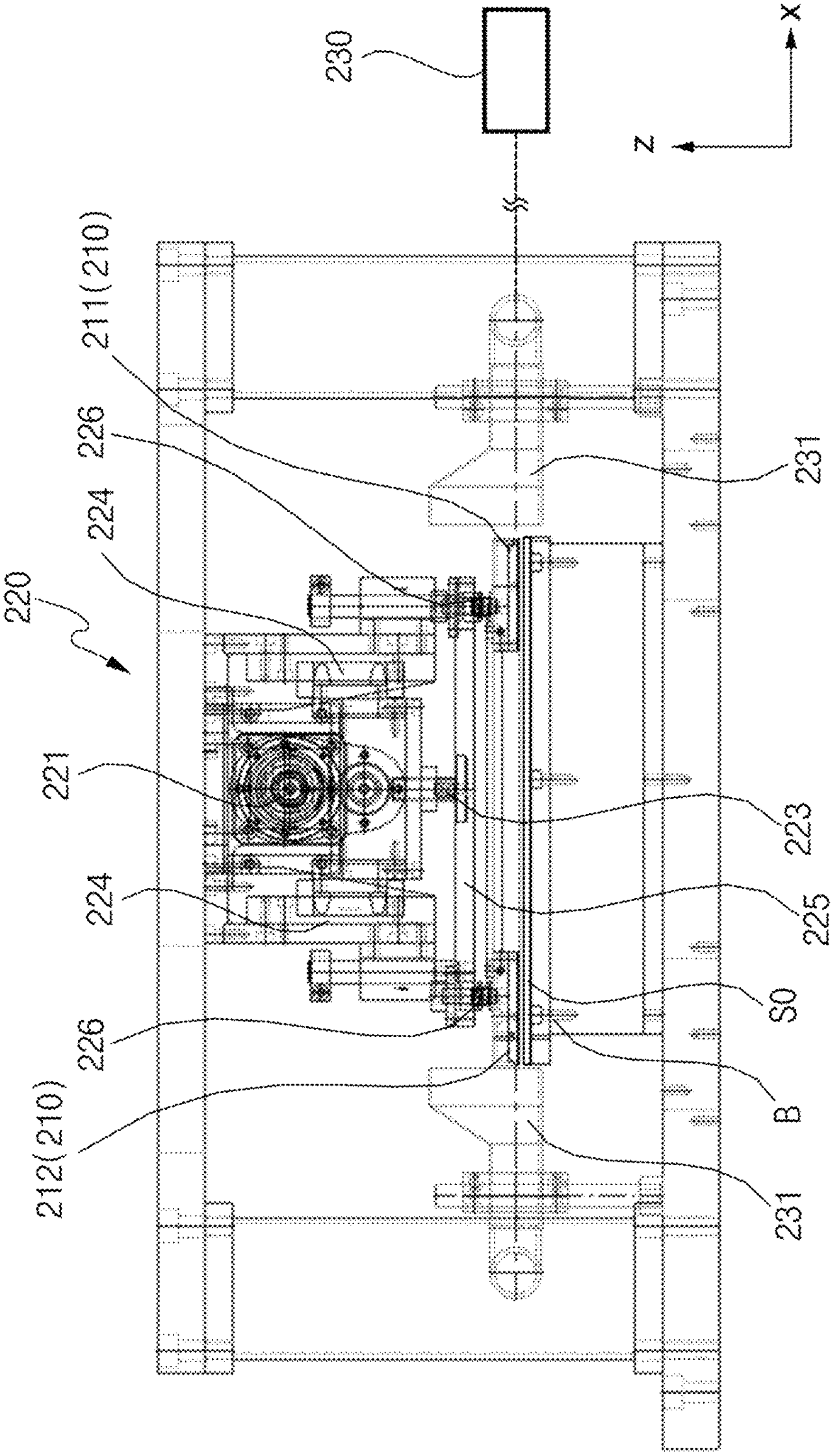
FIG. 4 is a view showing the notching portion when viewed from a transfer direction.
Figure 5:
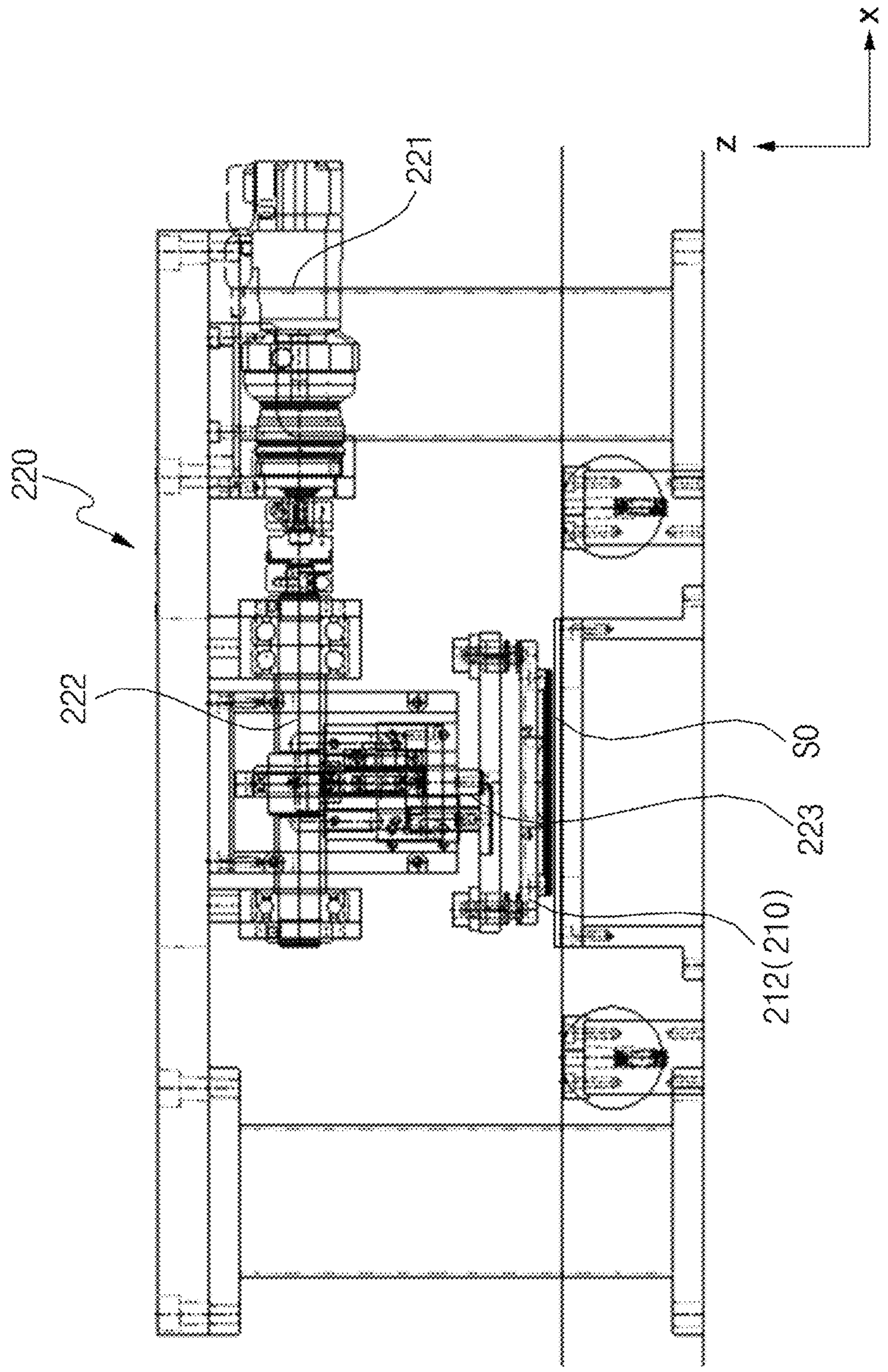
FIG. 5 is a view showing the notching portion when viewed from the front-and-rear direction.

FIG. 4 is a view showing the notching portion 30 when viewed from the transfer direction x, and FIG. 5 is a view showing the notching portion 30 when viewed from the front-and-rear direction y.

Referring to FIGS. 4 and 5, the driving portion 220 of the pusher portion 200 may include a motor 221, a shaft 222, a pusher rod 223, a guide 224, and a holder 225.

The motor 221 provides a driving force to allow the pusher rod 223 to move in the height direction z. The shaft 222 is connected to the motor 221 to transmit the power of the motor 221 to the pusher rod 223. The pusher rod 223 moves in the height direction z along the guide 224. Various power transmission devices may be placed between the shaft 222 and the pusher rod 223 to convert the rotational motion of the shaft 222 into linear reciprocating motion. The holder 225 is coupled to the pusher rod 223, and as the pusher rod 223 moves up and down, it moves together. The pusher 210 is positioned in the holder 225, so when the pusher rod 223 descends, it descends together and makes contact with the electrode material S0. An elastic member 226 may be placed between the holder 225 and the pusher 210. The elastic member 226 may be a component that exhibits a restoring force when stretched or contracted in the height direction z. This elastic member 226 guides the pusher 210 to ensure that the electrode material S0 comes into close contact with the base B when pressed by the pusher 210.

When the transfer of the electrode material S0 stops, the first pusher 211 and the second pusher 212 descend together and make contact with the first area A1 and the second area A2 of the electrode material S0 simultaneously, allowing the electrode material S0 to be fixed to the base B.

A suction portion 240 serves to suction and remove scrap SR generated during the notching process. The suction portion 240 includes suction hoods 241. During the notching process, when the suction portion 240 operates, the suction hoods 241 are each positioned in front of and behind the base B in the front-and-rear direction y, allowing it to directly suction the scrap SR of the electrode material S0 separated at the front notching line NL1 and the scrap SR of the electrode material S0 separated at the rear notching line NL2.

Figure 6:
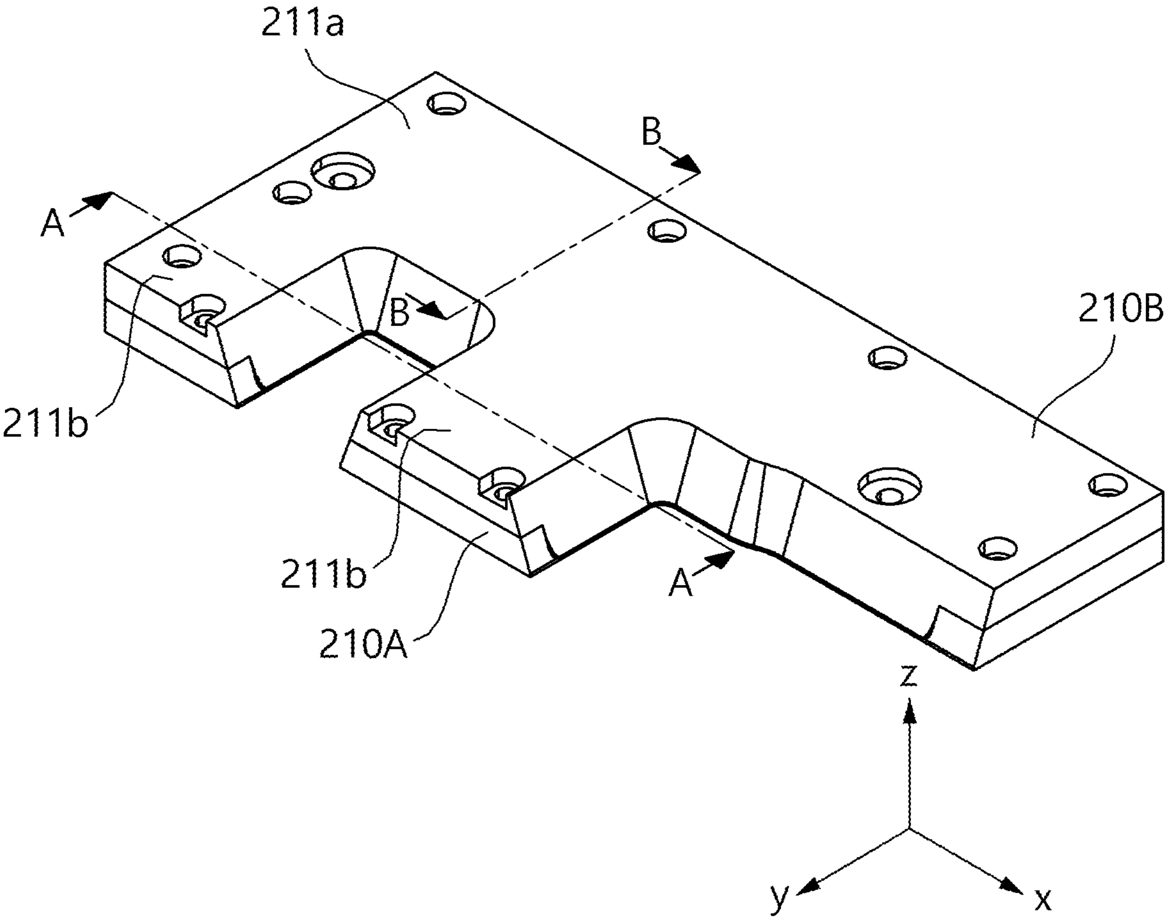
FIG. 6 is a perspective view showing a first pusher.

FIG. 6 is a perspective view showing the first pusher 211.

Referring to FIG. 6, the first pusher 211 may include a lower block 210A and an upper block 210B that is stacked on and coupled to the lower block 210A. The lower surface of the lower block 210A is flat and in contact with the first area A1 (see FIG. 2) of the electrode material S0. The upper block 210B may be coupled to the holder 225. The size of the lower block 210A may be smaller than that of the upper block 210B. In order to make contact with both the coated portion Sa and the non-coated portion Sb, the first pusher 211 has the following characteristics:

The first pusher 211 may include a body 211*a* in contact with the coated portion Sa and an extension portion 211*b* in contact with both the non-coated portion Sb and the coated portion Sa. The extension portion 211*b* may be disposed to extend from the front of the body 211 and protrude forward. The size of the extension portion 211*b* may be appropriately set, considering the size of the electrode tab Sc. The extension portion 211*b* may be formed on both the lower block 210A and the upper block 210B or only on the lower block 210A.

Figure 7:
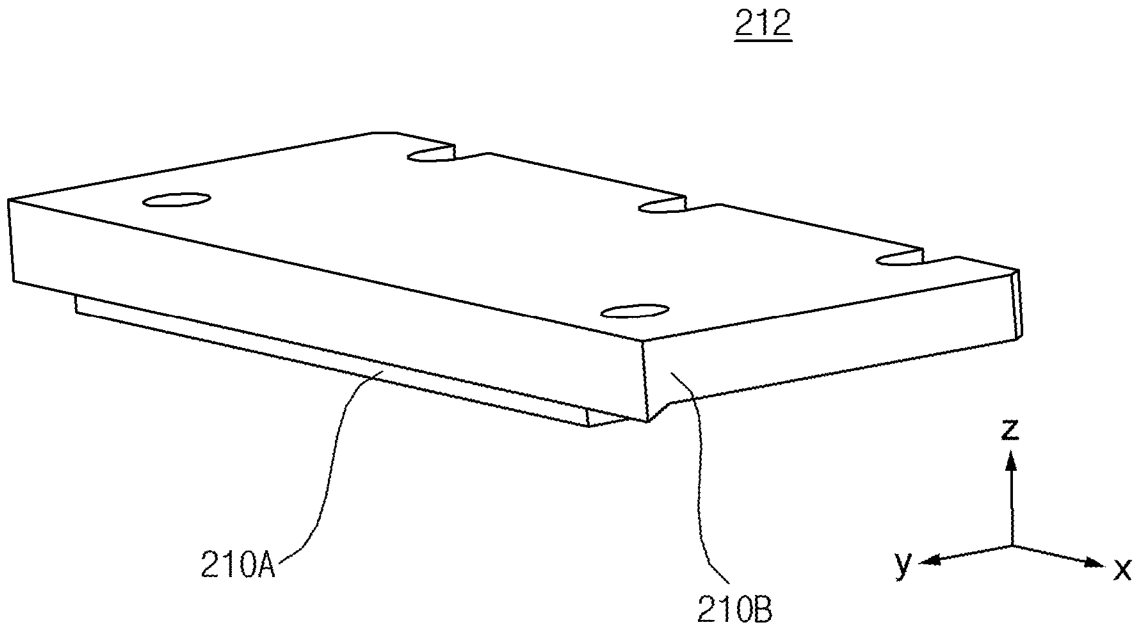
FIG. 7 is a perspective view showing a second pusher.

FIG. 7 is a perspective view showing the second pusher 212.

Referring to FIG. 7, the second pusher 212 may include a lower block 210A and an upper block 210B that is stacked on and coupled to the lower block 210A. The lower surface of the lower block 210A is flat and in contact with the second area A2 (see FIG. 2) of the electrode material S0. The upper block 210B may be coupled to the holder 225. Unlike the first pusher 211, the front edge of the second pusher 212 has no extension portion 211*b* and has a straight shape.

Figure 8:
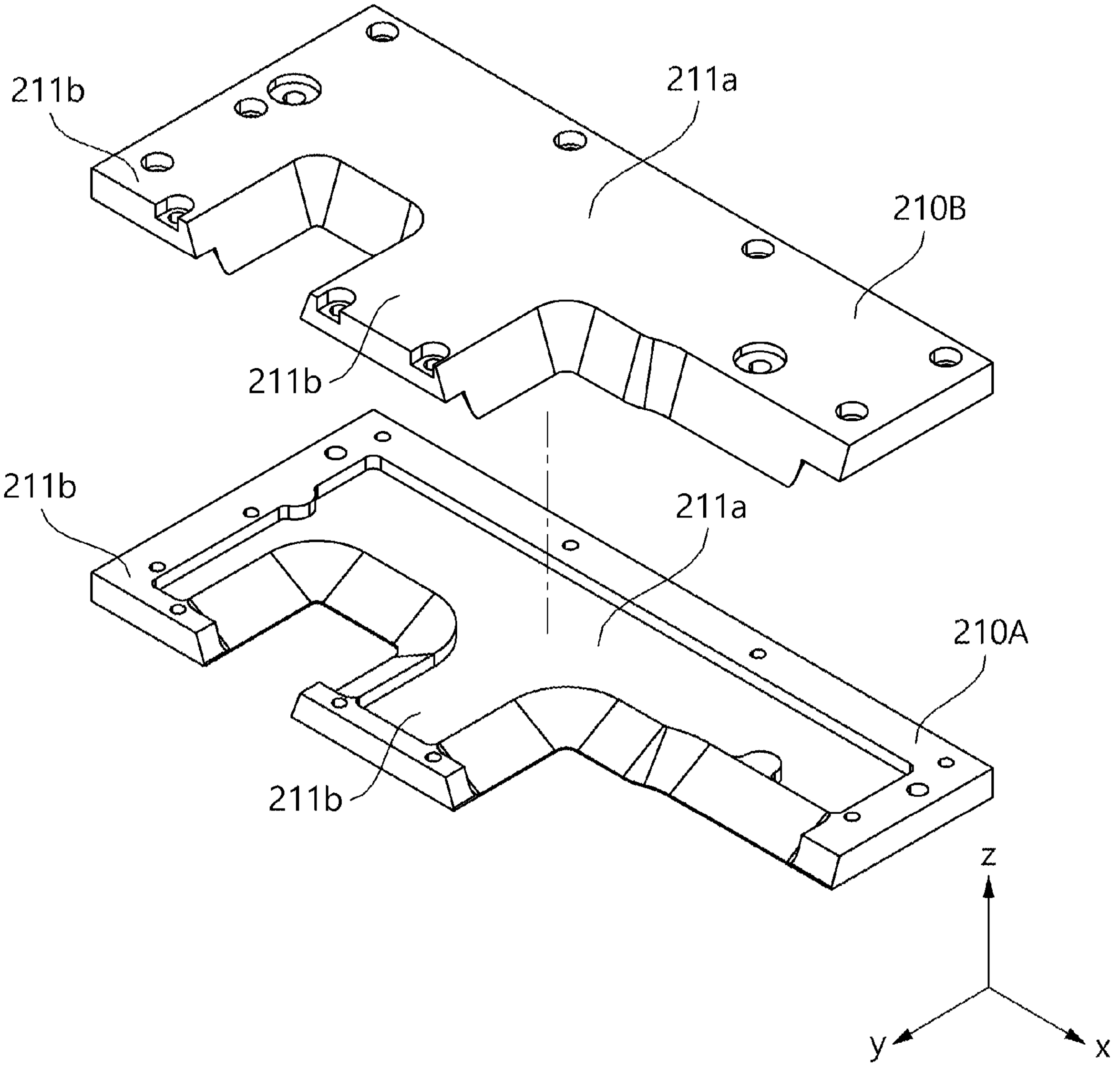
FIG. 8 is an exploded view of the first pusher.
Figure 9:
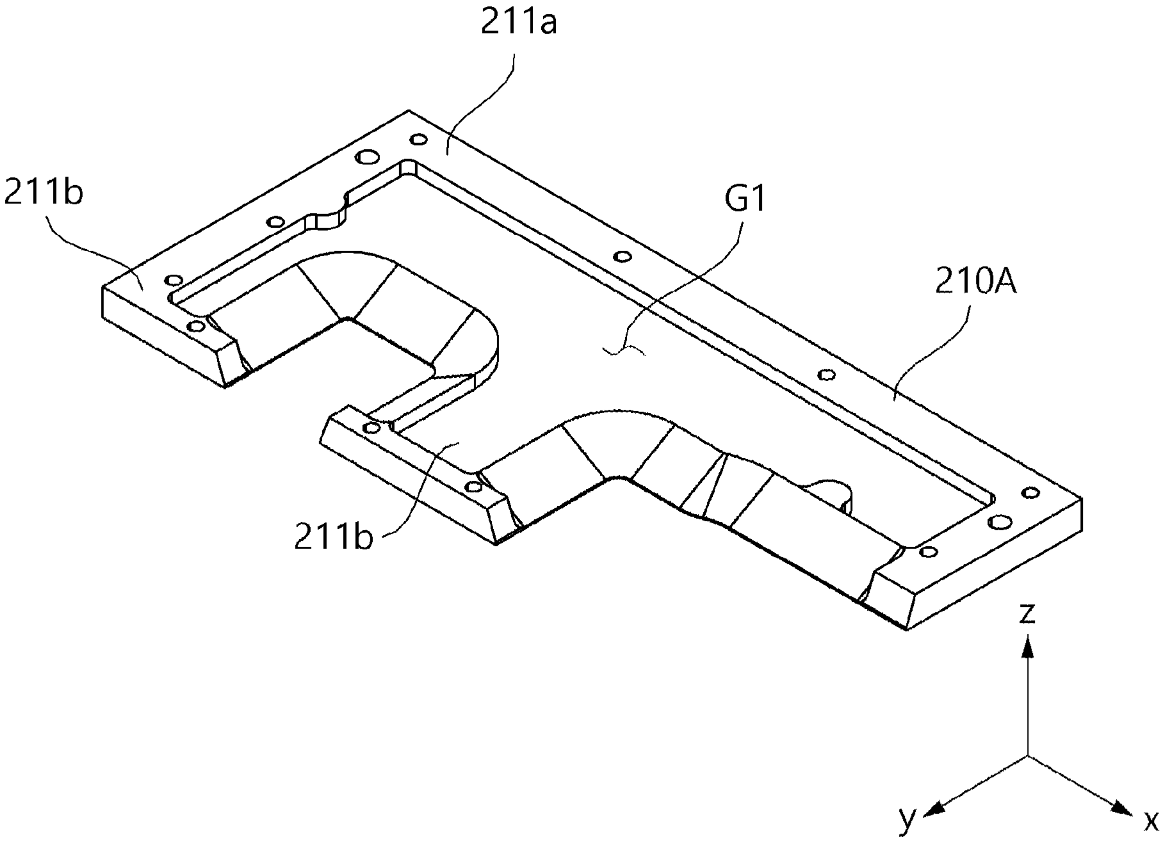
FIG. 9 is a view showing a lower block of the first pusher.
Figure 10:
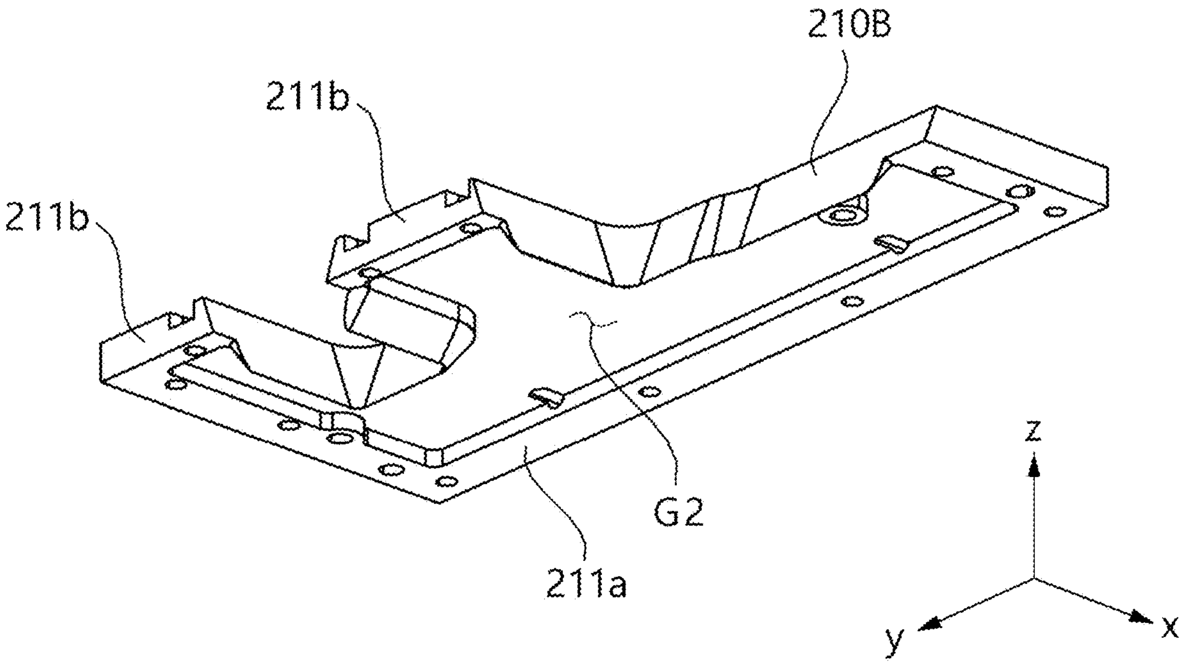
FIG. 10 is a view showing an upper block of the first pusher.

FIG. 8 is an exploded view of the first pusher 211, FIG. 9 is a view showing the lower block 210A of the first pusher 211, and FIG. 10 is a view showing the upper block 210B of the first pusher 211.

Referring to FIGS. 8 and 9, the lower block 210A includes a first groove G1. The first groove G1 is concavely formed on the upper surface of the lower block 210A. The first groove G1 may be formed over the body 211*a* and the extension portion 211*b*.

Referring to FIGS. 8 and 10, the upper block 210B includes a second groove G2. The second groove G2 is concavely formed on the lower surface of the upper block 210B. The second groove G2 may be formed over the body 211*a* and the extension portion 211*b*.

In the coupled state of the lower block 210A and the upper block 210B, the first groove G1 and the second groove G2 form an air passage U that communicates with an air nozzle portion 250.

Figure 11:
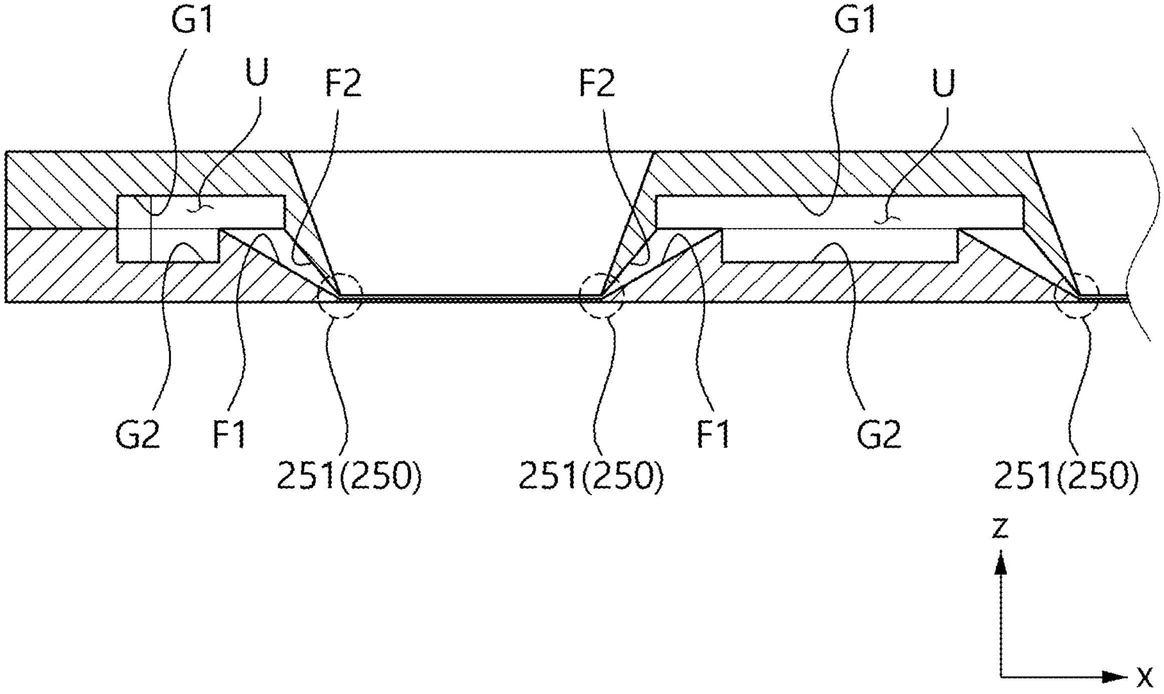
FIG. 11 is a side cross-sectional view of the first pusher taken along line A-A of FIG. 6.
Figure 12:
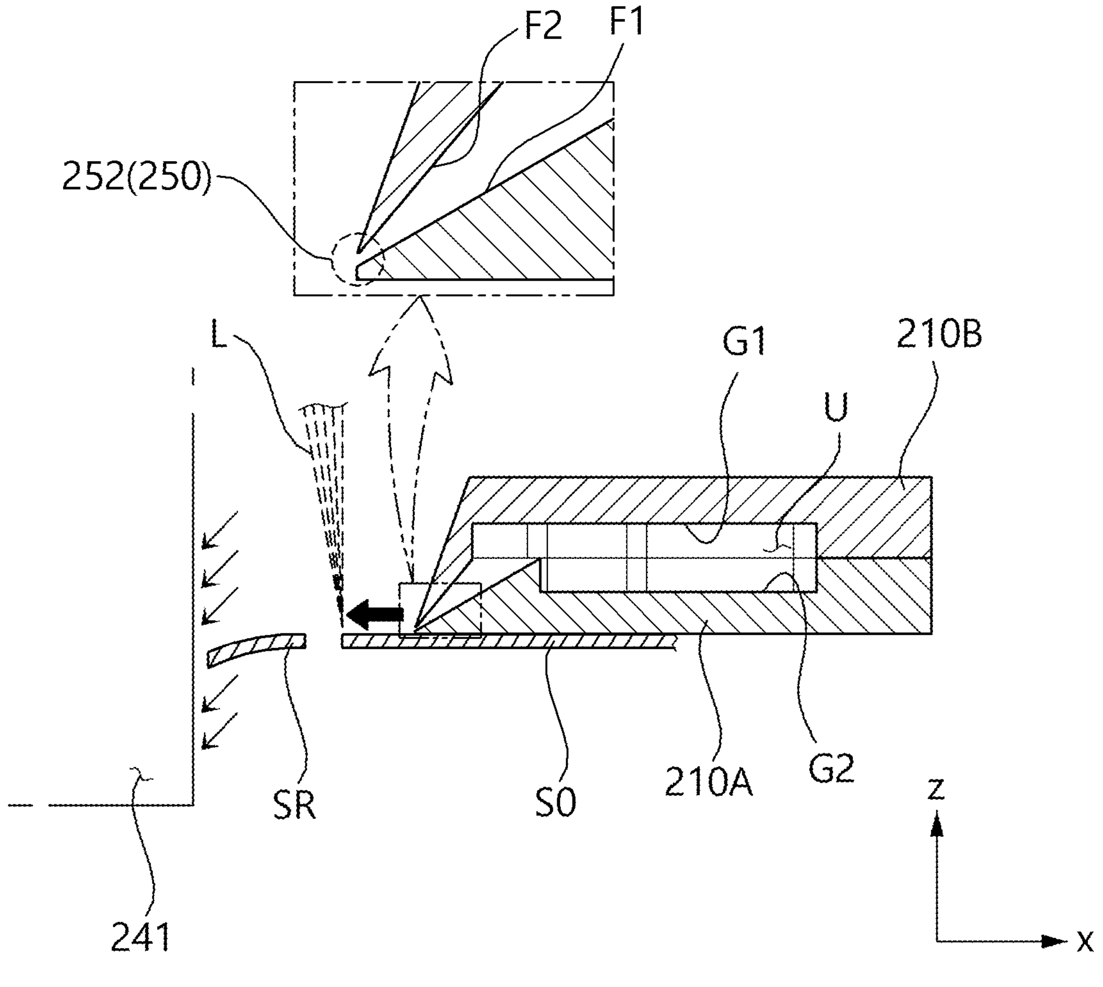
FIG. 12 a side cross-sectional view of the second pusher taken along line B-B of FIG. 6.
Figure 13:
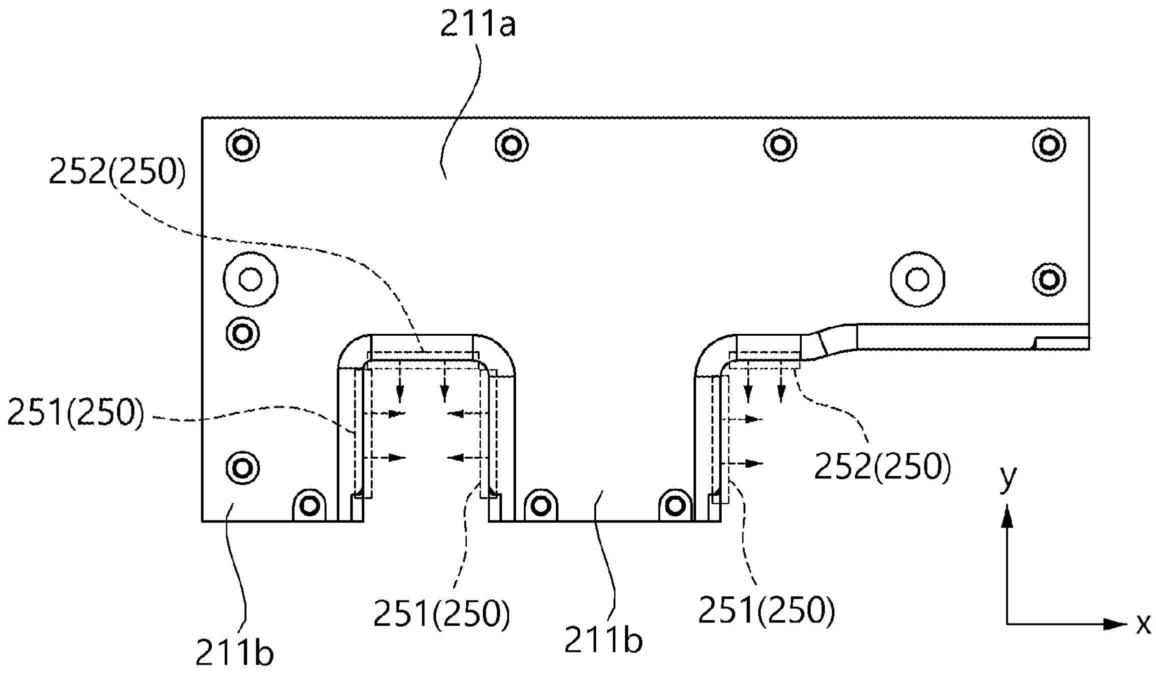
FIG. 13 is a plan view of the first pusher.
Figure 14:
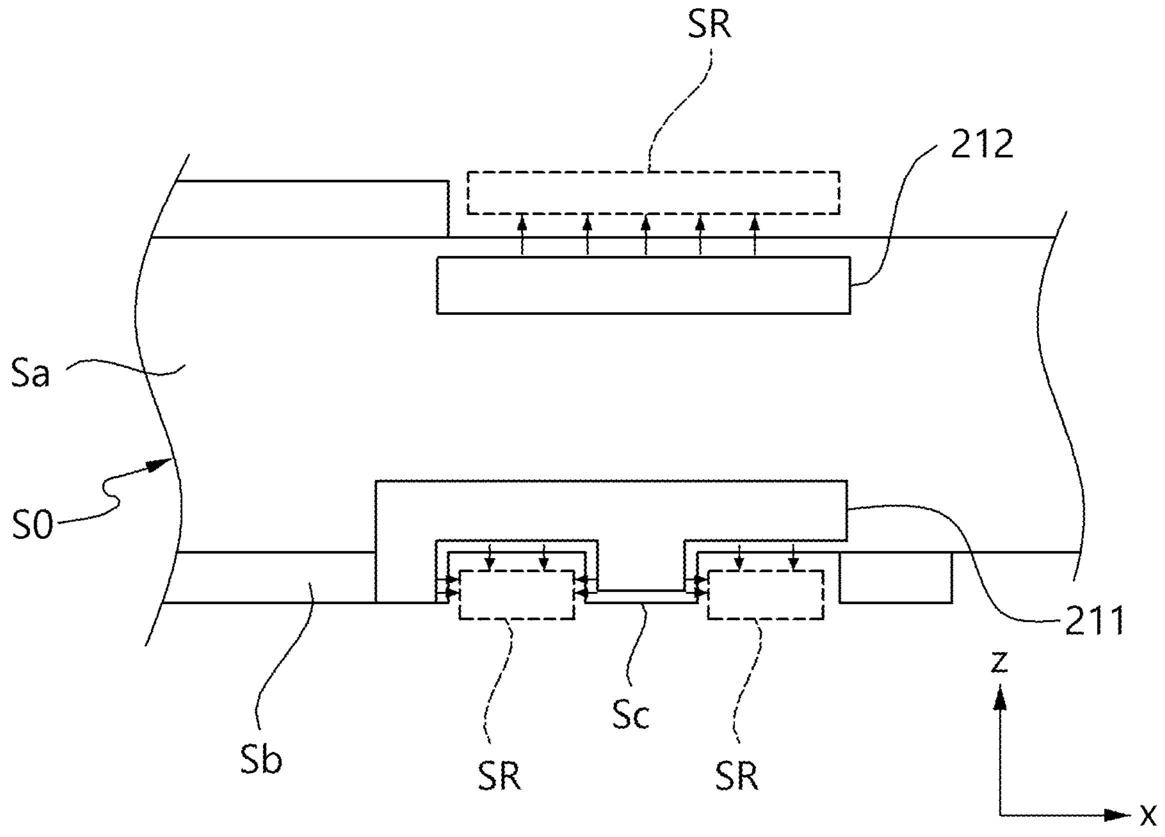
FIG. 14 is a view showing a state in which scrap is separated from an electrode material through an air nozzle portion.

FIG. 11 is a side cross-sectional view of the first pusher 211 taken along line A-A of FIG. 6, FIG. 12 is a side cross-sectional view of the second pusher 212 taken along line B-B of FIG. 6, FIG. 13 is a plan view of the fist pusher 211, and FIG. 14 is a view showing a state in which scrap is separated from the electrode material S0 through the air nozzle portion 250.

Referring to FIGS. 11 and 12, the pusher 210 forms the air nozzle portion 250 in the gap between the lower block 210A and the upper block 210B. The air nozzle portion 250 is connected to the air blower 230 and, during notching, sprays air supplied by the air blower 230 through the outlet of the air nozzle portion 250.

The first pusher 211 forms an angular C-shaped air nozzle portion 250, and the second pusher 212 forms a straight air nozzle portion 250.

Referring to FIG. 11, the lower block 210A of the first pusher 211 may include a first surface F1 that forms the air nozzle portion 250. The upper block 210B may include a second surface F2 that forms the air nozzle portion 250. The first surface F1 and the second surface F2 are arranged facing each other with a gap therebetween. The outlet of the air nozzle portion 250 may be positioned toward the notching line NL.

The first surface F1 and the second surface F2 may each be inclined toward the outlet of the air nozzle portion 250 such that the area of the air nozzle portion 250 decreases toward the outlet of the air nozzle portion 250.

The inclination of the slope formed by the first surface F1 with respect to the lower surface of the lower block 210A may be smaller than the inclination of the slope formed by the second surface F2 with respect to the lower surface of the lower block 210A.

As shown in FIGS. 11 to 14, the air nozzle portion 250 may include a first air nozzle 251 and a second air nozzle 252. The first pusher 211 may include both the first air nozzle 251 and the second air nozzle 252, while the second pusher 211 may include only the first air nozzle 251.

The first air nozzle 251 is arranged along the front-and-rear direction y on the body 211*a* and sprays air from behind the scrap SR. The second air nozzle 252 is positioned on the extension portion 211*b* and arranged along the left-and-right direction x, spraying air from the side of the scrap SR.

During the irradiation of the electrode material S0 with laser, air is sprayed through the air nozzle portion 250 toward the notching line NL. The scrap SR notched by the laser is easily separated from the electrode material S0 by the air sprayed. During notching by the first pusher 211 and the second pusher 212, air is sprayed, facilitating the easy separation of scrap SR from the electrode material S0. The separated scrap SR may be immediately suctioned and removed by the suction hood 241.

In the case of the first pusher 211, air is sprayed from the rear and lateral surfaces of the scrap SR, allowing for easy separation of the scrap SR from the electrode material S0.

Figure 15:
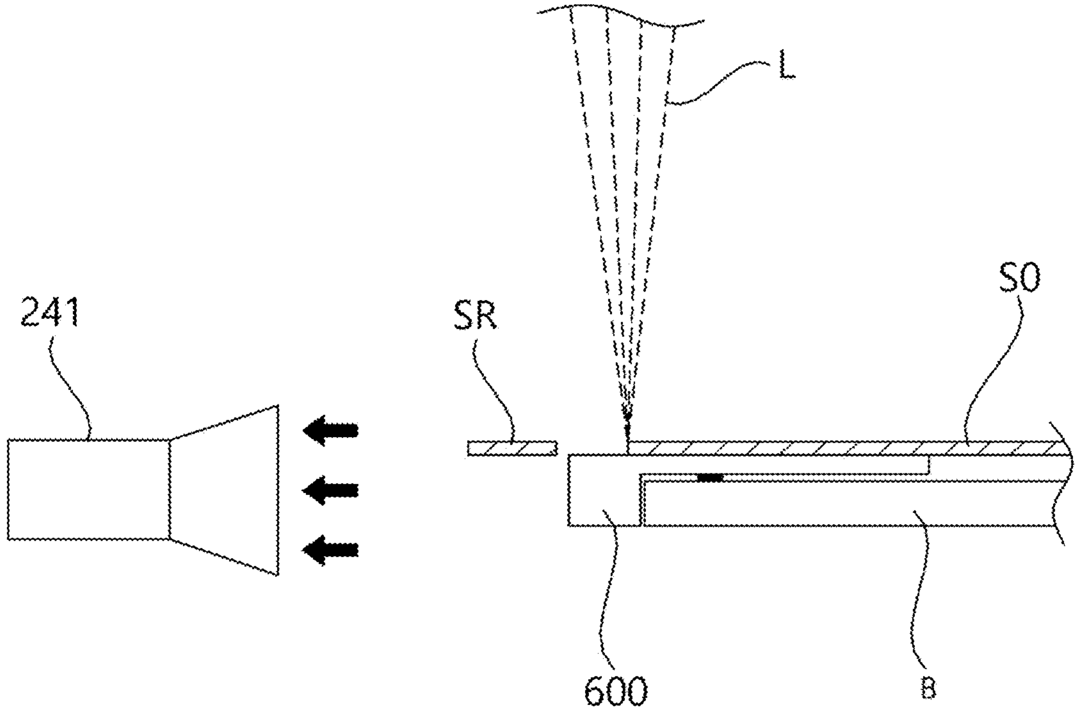
FIG. 15 is a diagram for describing a lower plate detachably attached to a base at the bottom of a notched area of an electrode.
Figure 16:
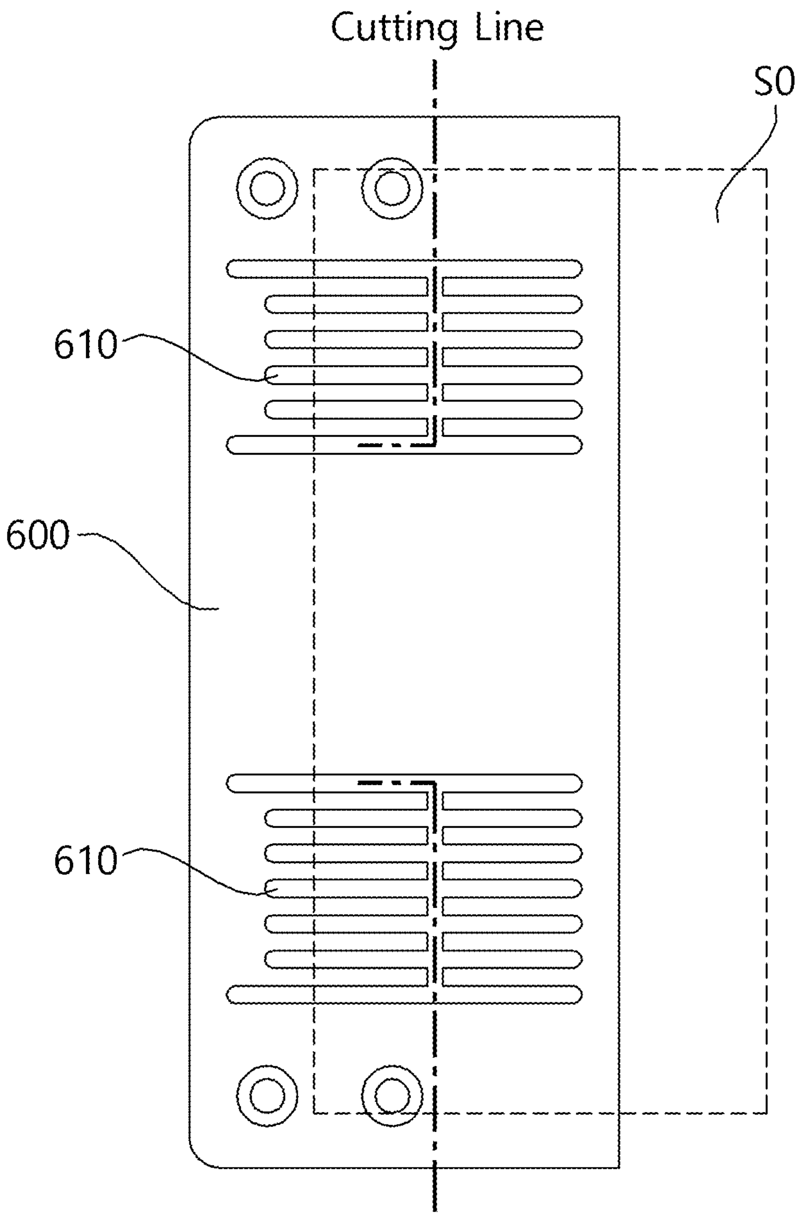
FIGS. 16, 17 and 18 are views for describing the structure of the lower plate.
Figure 17:
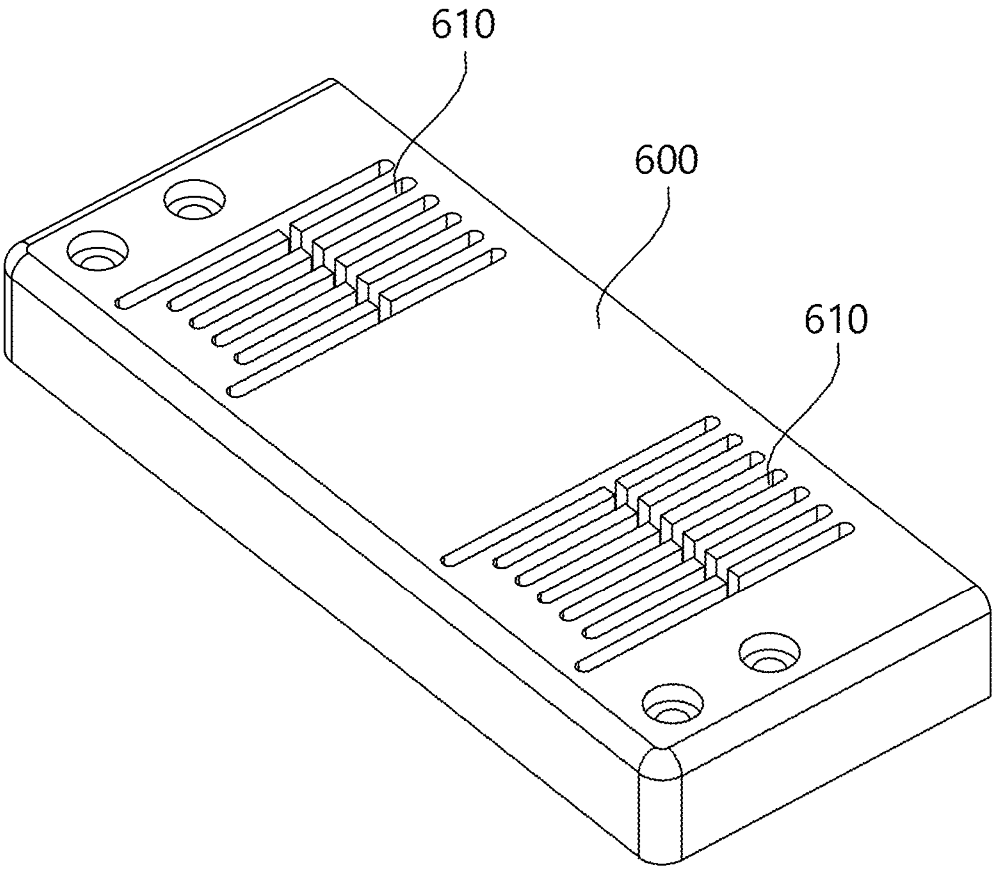
Figure 18:
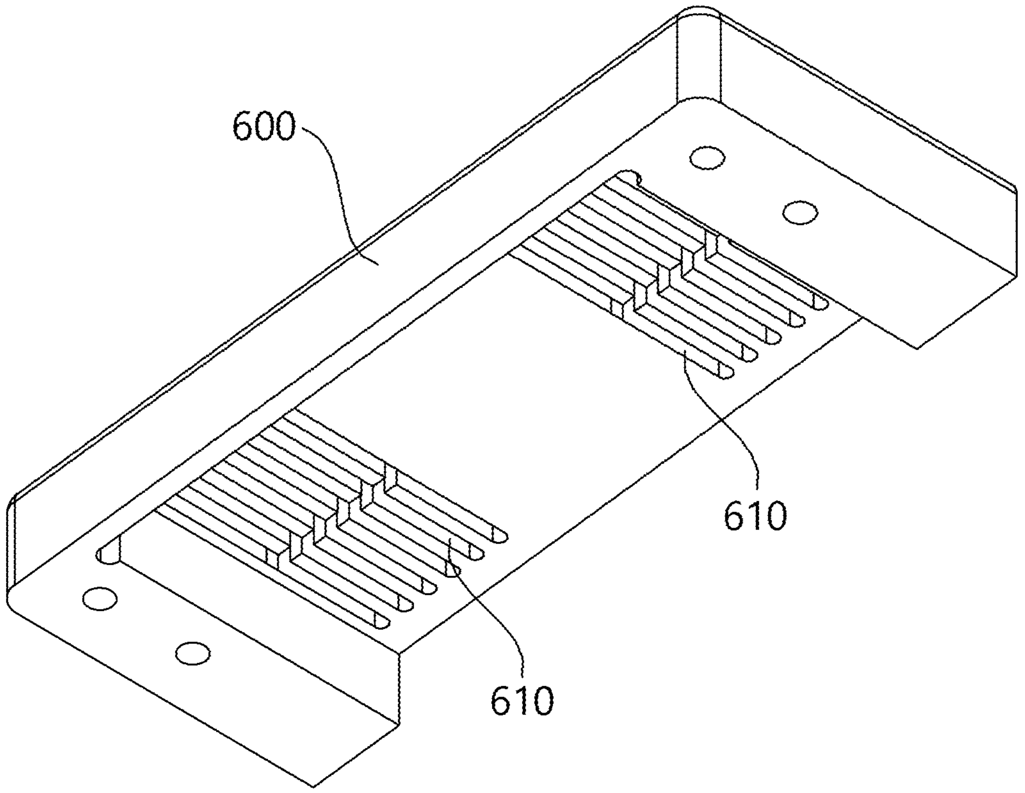

FIG. 15 is a diagram for describing a lower plate 600 detachably attached to a base at the bottom of a notched area of an electrode, and FIGS. 16 to 18 are diagrams for describing the structure of the lower plate 600.

According to the description in FIG. 12, during the notching process of the electrode material S0 by the laser, scrap SR is generated. The scraps SR separated from the front notching line NL1 and the rear notching line NL2 is removed by the suction hoods 241 of the suction portion 240.

Since the electrode material S0 is brought into close contact with the base B by the pusher 210, the scrap SR generated during notching may also be in close contact with a base B, making it challenging for the suction hood 241 to adsorb the scrap SR.

To address these issues, the lower plate 600 may be detachably attached to both ends of the base B that correspond to the area irradiated with the laser beam L. On the upper surface of the lower plate 600, through slots 610 are formed, allowing the air flowing at the bottom of the through slots 610 to push the scrap SR while passing through the through slots 610 when the suction portion 240 adsorbs the scrap SR. This allows the scrap SR to be quickly discharged through the suction hood 241.

The lower plate 600 may be in the shape of an empty box with one lateral side open, allowing one end of the base B to be inserted, while the remaining lateral sides are closed, and it has a structure that accommodates the end of the base B. Alternatively, the lower plate 600 may be formed into a structure that has one lateral side and the bottom side open and a hollow interior, enabling it to cover the end of the base B from the top.

Additionally, instead of the lower plate 600, directly forming through slots on an area at both ends of the base B that corresponds to the area irradiated with the laser beam L may achieve the same effect.

Figure 19:
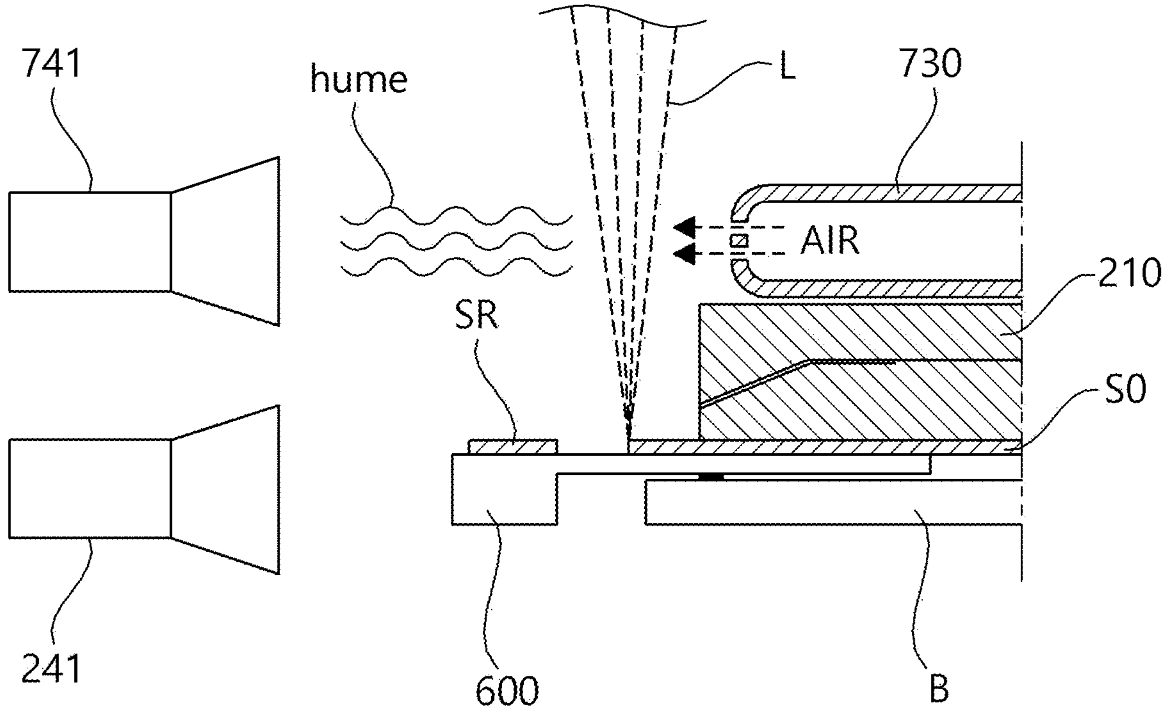
FIG. 19 is a diagram for describing the removal of gas (fume) generated during laser notching.

FIG. 19 is a diagram for describing the removal of gas (fume) or dust generated during laser notching.

During laser notching, dust generated during the process may adhere to the notching line. Additionally, dispersed dust may contaminate the surface and vicinity of the electrode. To prevent these issues, it is possible to minimize the space where dust can adhere to the electrode by covering areas beyond the minimum distance (0.5 mm to 2 mm) for air spraying during laser notching.

An air generating portion 730 which is disposed above the pusher portion 210 and configured to blow out gas or dust generated when the laser beam L notches the electrode S0 and a fume hood 741 configured to inhale and discharge the gas or dust blown outwards by the air generating portion 730 may be further provided.

When the coated portion of the electrode S0 is cut with a laser beam L, the volatile material of the electrode is burnt by the laser beam L, generating gas (fume) in the form of smoke. If this gas settles on the coated portion of the electrode S0, it may change the characteristics of the electrode, leading to defects. Alternatively, dust may scatter during the notching process.

Although the pusher 210 covers the electrode S0 and air is expelled through the air nozzle 250 of the pusher 210 to push simultaneously scrap SR and gas (fume) or dust outward, the air generating portion 730 is provided on the upper side of the pusher 210 to address situations where gas (fume) or dust cannot be entirely removed, ensuring that the gas (fume) does not affect the coated portion of the electrode and preventing the scattering of dust.

In addition, in cases where a large amount of air is suctioned by the suction hood 241 for removing scrap SR, the suction pressure weakens, hindering efficient discharge of scrap SR. Thus, the fume hood 741 for removing gas (fume) may be provided. The fume hood 741 is configured to suction air similarly to the suction hood 241.

In addition, while the present invention describes the transfer of the electrode material S0 in the horizontal direction and notching and cutting in the vertical (top to bottom) direction, it is not limited to this configuration. The electrode material S0 may also be transferred in the vertical direction (top to bottom or bottom to top), and notching and cutting may be performed in the horizontal direction.

In the above, specific examples of the secondary battery electrode production system of the present invention have been described, but it is obvious that various implementation modifications are possible within the limit not departing from the scope of the present invention.

Therefore, the scope of the present invention should not be limited to the aforementioned embodiments, but should be defined by the equivalents to the appended claims as well as the claims.

Accordingly, it should be understood that the above-described embodiments are merely exemplary and is not limited, and it should be interpreted that the scope of the present invention is represented by the claims rather than the description, and the changes or modifications derived from the claims and the equivalents thereof pertain to the scope of the present invention.

INDUSTRIAL APPLICABILITY

The present invention can be efficiently applied in the field of manufacturing a notching portion of a secondary battery electrode production system.

What is claimed is:

1. A secondary battery electrode production system for producing a secondary battery electrode, comprising a notching portion configured to form an electrode tab of an electrode by notching an electrode material, wherein the notching portion comprises a laser portion configured to irradiate the electrode material with a laser beam along a notching line, and a pusher portion disposed above the electrode material, and the pusher portion comprises a pusher in contact with the electrode material and an air blower connected to the pusher, wherein the pusher, during notching, makes contact with an area of the electrode material excluding the notching line, fixing the electrode material while fixing both a coated portion and a non-coated portion of the electrode material, wherein the pusher comprises a lower block in contact with the electrode material, an upper block coupled to the lower block, and an air nozzle portion that corresponds to a gap between the lower block and the upper block, and the pusher comprises a first pusher and a second pusher, wherein the first pusher and the second pusher are spaced apart from each other in a front-and-rear direction, and the first pusher presses both the coated portion and the non-coated portion, while the second pusher presses only the coated portion, wherein the first pusher comprises a body in contact with the coated portion, and an extension portion in contact with both the non-coated portion and the coated portion and the air nozzle portion comprises a first air nozzle disposed along the front-and-rear direction on the body and configured to spray air from behind scrap and a second air nozzle disposed along a left-and-right direction on the extension portion and configured to spray air from the side of the scrap.

2. The secondary battery electrode production system of claim 1, wherein:

the lower block comprises a first groove formed concavely on an upper surface, the upper block comprises a second groove concavely formed on a lower surface, and in a coupled state of the upper block and the lower block, the first groove and the second groove form an air passage that communicates with the air nozzle portion.

3. The secondary battery electrode production system of claim 2, wherein the lower block includes a first surface that forms the air nozzle portion and the upper block includes a second surface that forms the air nozzle portion.

4. The secondary battery electrode production system of claim 3, wherein the first surface and the second surface are each inclined toward an outlet of the air nozzle portion such that the area of the air nozzle portion decreases toward the outlet of the air nozzle portion.

5. The secondary battery electrode production system of claim 4, wherein an inclination of a slope formed by the first surface with respect to a lower surface of the lower block is smaller than an inclination of a slope formed by the second surface with respect to a lower surface of the lower block.

6. The secondary battery electrode production system of claim 1, wherein:

the pusher fixes the electrode material to a base, a lower plate is further provided which is detachably attached to both ends of the base that correspond to an area irradiated with the laser beam, and a through slot is formed on an upper surface of the lower plate to facilitate a discharge of scrap generated during notching.

7. The secondary battery electrode production system of claim 6, wherein the base has through slots formed on an area at both ends of the base that corresponds to an area irradiated with the laser beam, facilitating a discharge of scrap generated during notching.

8. The secondary battery electrode production system of claim 1, further comprising:

an air generating portion disposed above the pusher portion and configured to blow out gas (fume) or dust generated when the laser beam notches the electrode; and a fume hood configured to inhale and discharge gas or dust blown outwards by the air generating portion.

* * * * *